US012125382B2

(12) United States Patent
Blume et al.

(10) Patent No.: US 12,125,382 B2
(45) Date of Patent: Oct. 22, 2024

(54) METHOD AND A DEVICE FOR IDENTIFYING POTENTIAL HAZARD ZONES IN ROAD TRAFFIC

(71) Applicant: MERCEDES-BENZ GROUP AG, Stuttgart (DE)

(72) Inventors: Patrick Blume, Stuttgart (DE); Joachim Herbst, Nellingen (DE); Matthias Mallik, Schriesheim (DE); Hermann Trick, Alpirsbach (DE); Jochen Hipp, Tübingen (DE); Pilar Hernandez Mesa, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 11 days.

(21) Appl. No.: 17/914,513

(22) PCT Filed: Mar. 18, 2021

(86) PCT No.: PCT/EP2021/056993
§ 371 (c)(1),
(2) Date: Sep. 26, 2022

(87) PCT Pub. No.: WO2021/191051
PCT Pub. Date: Sep. 30, 2021

(65) Prior Publication Data

US 2023/0137142 A1 May 4, 2023

(30) Foreign Application Priority Data

Mar. 27, 2020 (DE) ..................... 10 2020 108 531.1

(51) Int. Cl.
*G08G 1/0967* (2006.01)
*G08G 1/01* (2006.01)
(Continued)

(52) U.S. Cl.
CPC ..... *G08G 1/096775* (2013.01); *G08G 1/0112* (2013.01); *G08G 1/0141* (2013.01);
(Continued)

(58) Field of Classification Search
CPC ...... B60Q 1/00; B62D 41/00; G01C 21/3461; G01C 21/3492; G06F 16/00; G06Q 40/08;
(Continued)

(56) References Cited

U.S. PATENT DOCUMENTS

2013/0214939 A1* 8/2013 Washlow ................. B60Q 9/00 340/901
2016/0180171 A1* 6/2016 Kamata .................. G06V 20/56 382/103
(Continued)

FOREIGN PATENT DOCUMENTS

CN 103236163 A 8/2013
CN 109035865 A 12/2018
(Continued)

OTHER PUBLICATIONS

Chinese First Office Action mailed Oct. 27, 2023, for corresponding/related Chinese Application No. 202180024516.8, including English translation (18 pages).
(Continued)

*Primary Examiner* — Stephen R Burgdorf
(74) *Attorney, Agent, or Firm* — PATENT PORTFOLIO BUILDERS PLLC

(57) ABSTRACT

A method for identifying potential hazard zones in road traffic by vehicles connected to a central computer unit involves recording an incident indicative of a potential hazard zone and transmitting it to the central computer unit with its geolocation. The transmitted incident is listed as a hotspot in a digital map if there are a large number of similar
(Continued)

Figure 1:
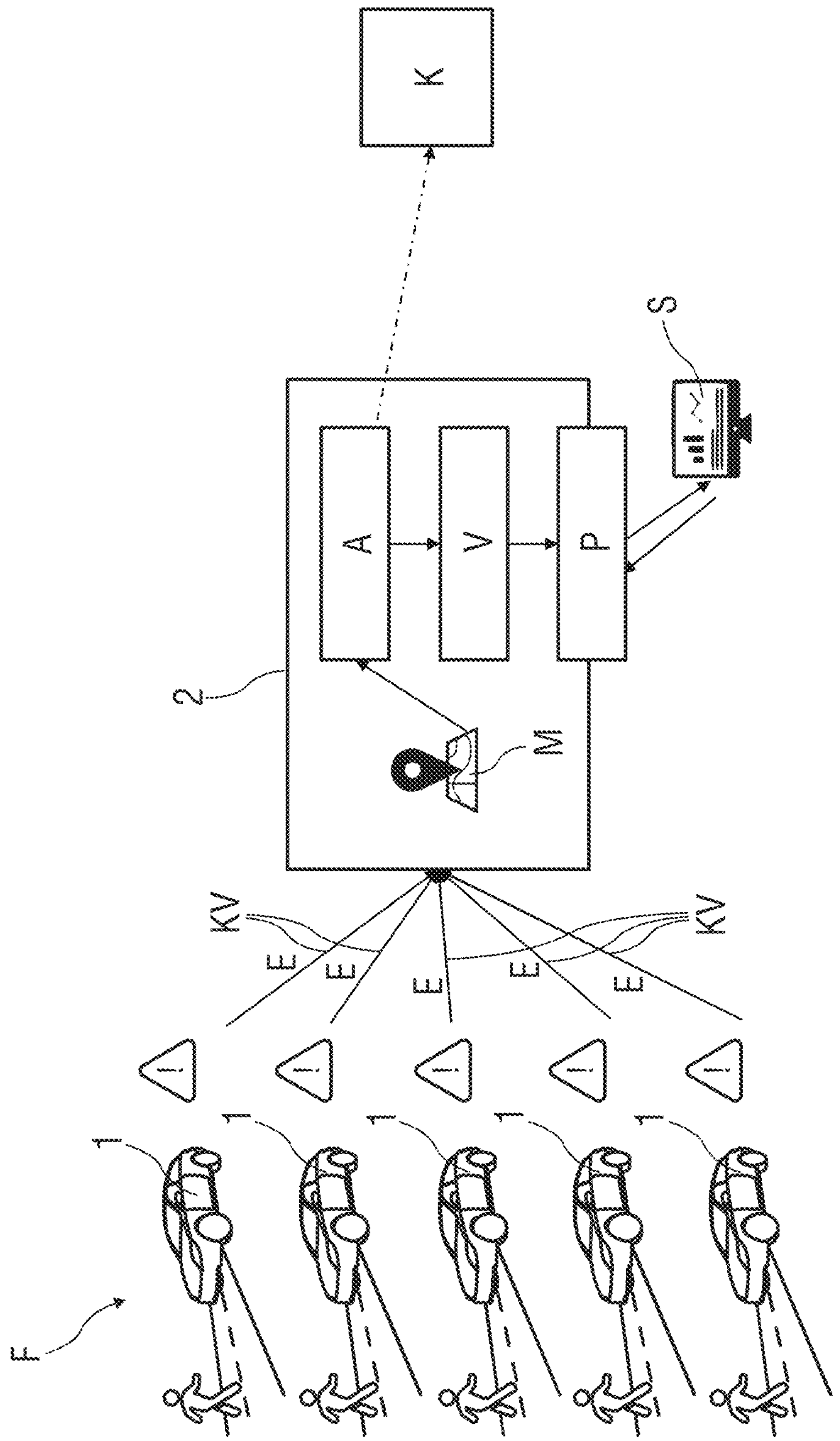

incidents with the same geolocation. Contextual information is added to the transmitted incident. The hotspot is analyzed for the identification of a potential hazard zone, a current hotspot is compared with confirmed hotspots, the hotspots are visualized on a platform, with a geolocation of a hotspot-confirmed traffic critical incident being transmitted to an authority to be checked and/or as a warning message to a vehicle currently near such an analyzed hotspot.

6 Claims, 2 Drawing Sheets

(51) Int. Cl.
*G08G 1/0969* (2006.01)
*G08G 1/16* (2006.01)

(52) U.S. Cl.
CPC ......... *G08G 1/0145* (2013.01); *G08G 1/0969* (2013.01); *G08G 1/164* (2013.01); *G08G 1/166* (2013.01)

(58) Field of Classification Search
CPC ........ G07C 5/00; G07C 5/008; G08G 1/0104; G08G 1/0112; G08G 1/0116; G08G 1/0133; G08G 1/0141; G08G 1/0145; G08G 1/0175; G08G 1/096716; G08G 1/096758; G08G 1/096775; G08G 1/0969; G08G 1/164; G08G 1/165
USPC .......................................................... 340/905
See application file for complete search history.

(56) References Cited

U.S. PATENT DOCUMENTS

| | | | |
|---|---|---|---|
| 2016/0379485 A1 | 12/2016 | Anastassov et al. | |
| 2017/0292842 A1 | 10/2017 | Kondo | |
| 2018/0364722 A1 | 12/2018 | Schlesinger et al. | |
| 2019/0147260 A1* | 5/2019 | May ...................... | B60W 50/14 382/103 |
| 2019/0163176 A1* | 5/2019 | Wang ................... | G05D 1/0027 |
| 2019/0329768 A1* | 10/2019 | Shalev-Shwartz ..... | G06V 20/56 |

FOREIGN PATENT DOCUMENTS

| | | |
|---|---|---|
| DE | 102019000630 A1 | 6/2019 |
| JP | 2009104531 A | 5/2009 |
| WO | 2014151793 A2 | 9/2014 |

OTHER PUBLICATIONS

International Search Report mailed Jun. 21, 2021 in related/corresponding International Application No. PCT/EP2021/056993.
Written Opinion mailed Jun. 21, 2021 in related/corresponding International Application No. PCT/EP2021/056993.
Office Action dated Apr. 12, 2024 in related/corresponding CN Application No. 202180024516.8.
Office Action dated Aug. 8, 2024 in related/corresponding JP Application No. 202180024516.

* cited by examiner

METHOD AND A DEVICE FOR IDENTIFYING POTENTIAL HAZARD ZONES IN ROAD TRAFFIC

BACKGROUND AND SUMMARY OF THE INVENTION

Exemplary embodiments of the invention relate to a method for identifying potential hazard zones in road traffic by means of vehicles connected to a central computer unit, wherein an incident indicative of a potential hazard zone is recorded and transmitted to the central computer unit with its geolocation. Exemplary embodiments of the invention also relate to a device for identifying potential hazard zones in road traffic by means of vehicles connected to a central computer unit, wherein a control unit of the vehicle is designed to detect, by means of signals recorded by an environmental sensor in the vehicle, an incident indicative of a potential hazard zone and to transmit this, with its geolocation, to the central computer unit over a data connection.

DE 10 2019 000 630 A1 discloses a method and a device for assigning a common geolocation to a plurality of incidents effected by a common root cause and captured by at least one vehicle. For each individual incident, a geolocation is collected. The captured incidents are indexed in a lexicographically sortable way. Subsets ordered lexicographically by incident or hotspots of a next higher multiplicity of the power set of the incidents are incrementally formed into lexicographically sorted lists of successive hotspots of the next lowest multiplicity, if the maximum distance within the combined set of the associated incidents at any one time does not exceed a predetermined maximum distance. In a subsequent filtering step, all hotspots are removed, whose set of incidents is a subset of another hotspot. A geolocation is assigned to each of the remaining hotspots, the geolocation being formed from at least the geolocations of all associated incidents.

Exemplary embodiments of the invention are directed to a method and a device for identifying potential hazard zones in road traffic.

A method for identifying potential hazard zones in road traffic by means of vehicles connected to a central computer unit provides that an incident indicative of a potential hazard zone is captured and is transmitted to the central computer unit with its geolocation. According to the invention, the transmitted incident is listed as a hotspot in a digital map if there are a large number of similar incidents with the same geolocation, and contextual information is added to the transmitted incident. Additionally, the hotspot is analyzed to identify a potential hazard zone and a current hotspot is compared to confirmed hotspots. The hotspots are then visualized on a platform, a geolocation of a hotspot of certain traffic-related incidents being transmitted to an authority for verification and/or as a warning message to a vehicle currently near such an analyzed hotspot.

An identification of potential hazard zones in road traffic carried out using the method, in particular of critical situations and/or dangerous locations, makes it possible to predictively avoid accidents, for example, and that, for example, responsible authorities can take measures to eliminate the hazard zone, without an accident having previously occurred.

In due course, further potential hazard zones can be predictively identified by deduction based on behavioral patterns of road users in the area of the hazard zone, at which no actual danger has yet arisen.

An extensive, continuously moving fleet of vehicles, for example consisting of vehicles by one vehicle manufacturer, continuously captures new incidents and thus enables a highly efficient process for generating relevant data, so that no dedicated vehicles need to be used.

Through a comparatively fast transmission of the hotspot to the vehicles connected to the central computer unit, which are in the area of such a hotspot, a vehicle user in a vehicle near such a hotspot can be warned effectively and comparatively quickly of a potential risk posed by the hotspot. In particular, the warning about the relevant hotspot is issued repeatedly if the particular vehicle is near it, until the hazard zone, in other words the hotspot, is eliminated and there is therefore no further danger for vehicles and, if applicable, other road users.

One embodiment of the method provides that the reported incident is added as contextual information for a time of day, a direction of travel of the vehicle, a length of a signal, a number of incidents over time, a level of curvature of a street, historical accidents, photographic and map data, pedestrian movements, cultural events at a certain time of day and/or further data points from other data providers. In particular, the contextual information can increase the validity of the hotspot and/or represent it more comprehensibly for road users.

A combination of data from various assistance systems of the vehicles and further data, in particular contextual information of a fleet of vehicles and/or external data sources such as weather, time, day of the week, as well as external data, e.g., accident data, map data, traffic flow data, allows a comparatively intelligent and automated analysis of the critical situations and/or dangerous areas in road traffic. This combination of the data can be helpful for public authorities, for the vehicles near the hotspot and also for other fleets of vehicles, in particular of other vehicle manufacturers.

As new situations, areas and contextual pieces of information are continuously taken into account in the analysis, findings of the analysis are steadily improved until potential hazard zones can be recognized predictively by deduction based on behavioral patterns.

In a development of the method, a hotspot of a specific traffic-critical incident is transmitted to, and displayed on, a display unit of an infotainment system of the vehicle as a warning message. For example, a section of a map is pictured on the display unit, wherein a geolocation of the hotspot is marked with a warning sign. In this way, a user of the vehicle that is in the immediate vicinity of the hotspot is made aware of the hotspot, so that the vehicle user can adapt their driving, for example by reducing a current driving speed.

In a further embodiment, the geolocation of the relevant hotspot is reported to a road authority, so that the road authority is informed of a substantially accurate position of the hotspot. In this way, it is possible for the road authorities, in the existing circumstances, to review why there is a hazard zone in this place. Thereafter, targeted measures can be introduced to eliminate the hazard zone.

Furthermore, the method provides that the hotspots shown on the platform can be validated by users of the platform. In this way, the respective user can give a response validating the hotspot. For example, it can be confirmed by the user that the hazard zone is still there, or that the hazard zone has been eliminated by appropriately introduced measures.

In a further possible embodiment, a particular hotspot is deleted from the digital map if an incident indicative of the potential hazard zone is no longer recorded by the car. The relevant hotspot representing a hazard zone is then only deleted from the digital map if a vehicle does not report the presence of the hazard zone to the central computer unit. Thus, for example, a piece of feedback from a user of the platform can be checked for plausibility in accordance with this.

In addition, the invention relates to a device for identifying potential hazard zones in road traffic by means of vehicles connected to a central computer unit. Here, a control unit of the vehicles is designed to detect, by means of signals recorded by an environmental sensor in the vehicle, an incident indicative of a potential hazard zone and to transmit this, with its geolocation, to the central computer unit over a data connection. According to the invention, the central computer unit is designed to enter the transmitted incident into a digital map as a hotspot if there are a large number of similar incidents with this geolocation, to add contextual information to the transmitted incident, to analyze the hotspot to identify a potential hazard zone, to compare a current hotspot with confirmed hotspots, to visualize the hotspots on a platform, to transmit a geolocation of a hotspot of certain traffic-related incidents to an authority and/or to transmit a geolocation of a hotspot of traffic-critical incidents to the control unit of a particular vehicle that is near such an analyzed hotspot.

By means of the device, in particular by means of the central computer unit, it is possible to inform a corresponding authority of the hotspot, so that the authority can introduce measures to eliminate the hazard zone.

Alternatively, or additionally, provided a vehicle connected to the central computer unit is in the immediate vicinity of the hotspot, the central computer unit transmits a geolocation of the hotspot to the vehicle as a warning message, so that the attention of the vehicle user is increased and, if necessary, a current speed of the vehicle is lowered in advance of passing through the hazard zone.

BRIEF DESCRIPTION OF THE DRAWING FIGURES

Exemplary embodiments of the invention are explained in more detail in the following, with the aid of drawings.

Figure 2:
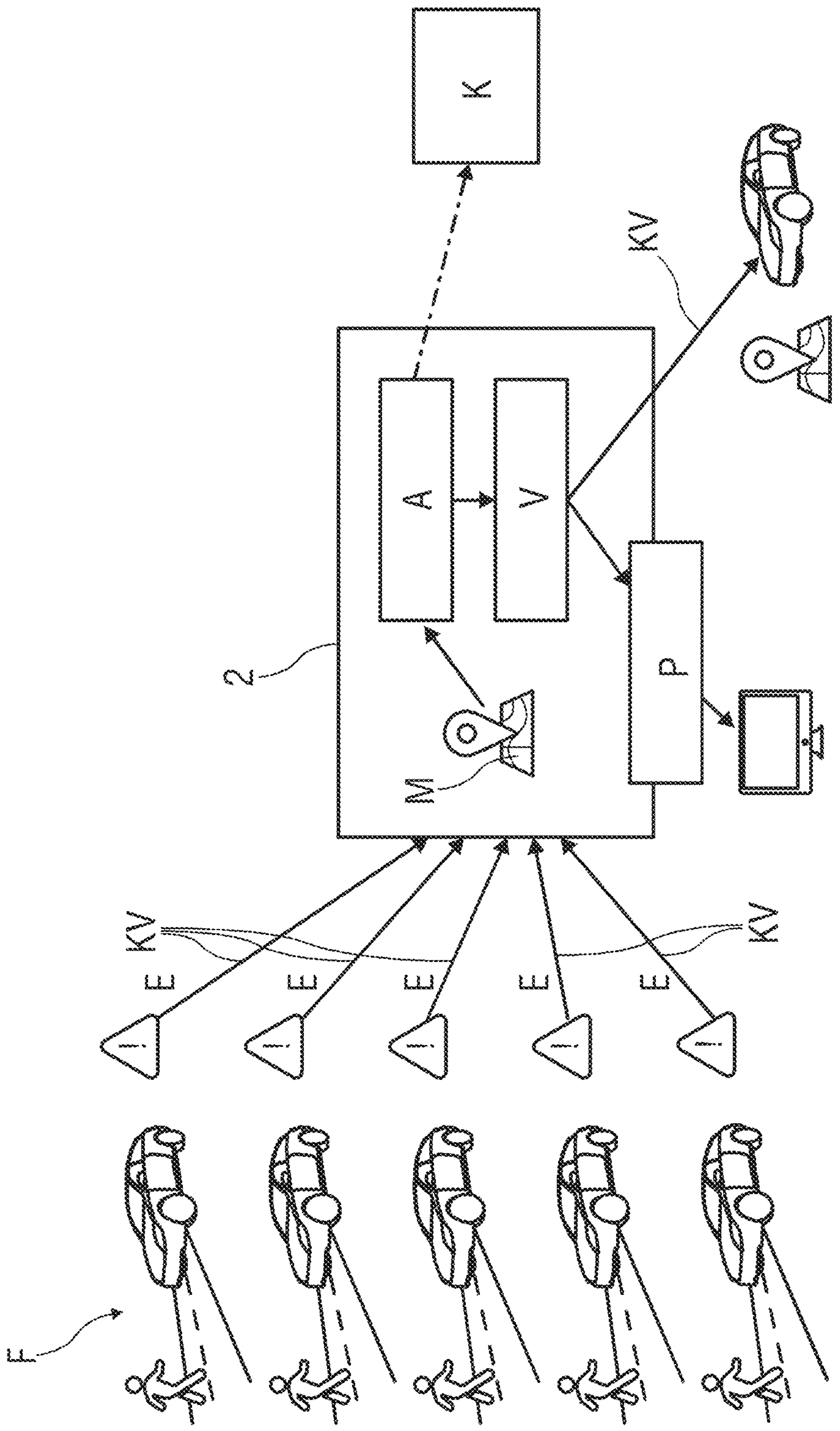

In these:

FIG. 1 schematically shows a sequence of a method for identifying potential hazard zones in road traffic and FIG. 2 schematically shows a sequence of the method with an additional option Parts that correspond to each other are given the same reference numerals in all figures.

DETAILED DESCRIPTION

In FIG. 1, a course of a method for identifying potential hazard zones in road traffic is shown.

It is generally known that despite planning, in particular architectural and infrastructural, potential hazard zones occur in public road traffic.

A dynamic and an interplay of topological, traffic-related and/or other external influences, such as e.g., precipitation, position of the sun, temperature, vegetation, altered volume of traffic, architectural changes, changes to a circuit of traffic lights etc., are relatively difficult to foresee during a planning stage for traffic and can later lead to difficult and dangerous driving conditions when the section of road is being used by road users.

For example, a pedestrian crossing can be difficult to see due to overgrown vegetation, with the pedestrian crossing being busier with pedestrians and also vehicles 1 after a certain day, due to a newly built school.

New potential hazard zones of this kind, in particular accident blackspots, cannot be satisfactorily identified by renewed planning, targeted inspection and/or manual observation, as, among other things, a reality of road traffic is comparatively complex. Ex-post evaluations are required for analyzing accidents and accident blackspots, but are not very effective in the context of personal injury, up to fatalities.

Currently, critical situations and/or dangerous locations in road traffic that e.g., lead to an accident and even fatalities, can often only be identified by the occurrence of this misfortune. For example, there are manually collected accident statistics that can help to record critical situations and/or dangerous areas in road traffic.

However, critical situations in which an accident would nearly have come about, but was just narrowly avoided, cannot be reconstructed, so a potential accident risk may or may not be lowered via infrastructural intervention.

A method to identify critical situations and/or dangerous areas in road traffic on the basis of accident data is generally known, wherein first, if an accident has occurred, this critical situation and/or dangerous location is categorized as critical, i.e., as a hazard zone.

Today's vehicles 1, in particular a fleet of vehicles F, so for example vehicles 1 of a vehicle manufacturer, have a number of assistance systems, the integral part of which is an environmental sensor with several sensors arranged in and/or on the vehicle 1. For example, the sensors work via radar, ultrasound, lidar and/or infrared radiation, it being additionally possible for at least one sensor to be designed as a camera. A detection area of the sensor designed as a camera is, in this context, in particular, directed in front of the vehicle 1.

By means of the environmental sensor, signals are continuously recorded in the driving mode of the respective vehicle 1, which are evaluated, processed and, if needed, supplied to a control unit of an assistance system or several control units of several assistance systems.

Based on the collected signals, a plurality of incidents E, in the form of critical situations and/or dangerous areas in a surrounding area of the respective vehicle 1, can be detected, with the individual incidents E being transmitted to a central computer unit 2 via an existing communication connection KV with the central computer unit 2.

In this way, warnings about, for example, pedestrians in the driving path of the vehicle 1 and/or emergency braking of the vehicle 1 that was triggered by a pedestrian, are reported to the central computer unit 2 as an incident E.

If, based on the reported incidents E, so-called hotspots are generated according to the prior art, an analysis A of this hotspot can, even before an accident occurs, contribute to assessing hazards, in that clusters of reports, so incidents E, relating to critical situations and/or dangerous areas are recognized as potential hazard zones, independent of pre-occurring accidents.

If such a hazard zone is recognized, this is sent to a public authority, in particular a road authority, so that it is possible, for example, to make ex ante architectural and/or regulatory changes in the hazard zone, and not only react once an accident has already occurred.

An analysis A of the hotspot can take place in the central computer unit 2, taking into account contextual information K, with, for example, a time of day, a direction of travel, a length of a signal, a number of incidents E over time, a level of curvature of a section of road, historical accidents, photographic and map data, pedestrian movements, cultural events at a certain time of day and further data points from other data providers being taken into account as contextual information K. In particular, contextual information K can increase a degree of validity of the hotspot and/or represent it more comprehensibly for road users.

The method for identifying potential hazard zones thus provides that the vehicles 1 of a fleet of vehicles F transmit incidents E detected by means of recorded signals of the environmental sensor to the central computer unit 2.

In the central computer unit 2, a definition and a mapping M of hotspots first occurs if there are a large number of similar incidents E, with the contextual information K being taken into account via location and time during the analysis A of the hotspots.

A comparison V of new hotspots with confirmed hotspots then follows, with identified hotspots being visualized on a corresponding platform P.

Feedback R to validate the visualization of the hotspots can be given to a user of the platform P over an interface S.

Through application of the method, hazard zones are therefore recognized, which are transmitted from the fleet of vehicles F to the central computer unit 2. Places, so geolocations, at which certain critical situations frequently occur, are reported to a road authority. The road authority can then decide whether the hazard zone can be eliminated by architectural and/or traffic-regulating measures.

Additionally, a place at which certain critical situations frequently occur can be reported by users, in particular vehicle users, who can thus, for example, get route options for a safer route suggested in the route guidance.

In FIG. 2, the course of the method is shown, with this having an additional option.

According to the embodiment of the method shown in FIG. 2, it is provided that, in that case of the vehicle 1 being near a traffic-critical hotspot that is stored in the digital map, a warning message is transmitted, via the communication connection KV, to a control unit connected by means of the central computer unit 2, in particular to an infotainment system of the vehicle 1.

By means of the warning message received by the vehicle, the vehicle user of the relevant vehicle 1 is informed about the hotspot that presents a potential source of danger, so that the vehicle user can adapt their driving behavior accordingly. For example, a current driving speed of the vehicle 1 is lowered for this purpose, in order to pass the hazard zone.

For example, this is displayed on a display unit of the infotainment system as a warning message: Warning—potential hazard zone/accident site ahead, it being possible for the warning message to, additionally or alternatively, be given audibly.

In particular, a warning message about an identified, safety-relevant hotspot is transmitted to the vehicle 1 that is near the hotspot. As soon as the vehicle 1 nears this hotspot, e.g., a crossroads at which an intervention of an assistance system is frequently recorded and there have been near-accidents, and that has been marked as a safety-relevant hotspot by the analysis A, the warning message is issued in the vehicle 1.

In one possible embodiment of the method, the hotspots are only sent to the vehicles 1 of the fleet of vehicles F that are near the hotspots. It is also conceivable for the hotspots to be transmitted to unshown further vehicles of a further fleet of vehicles, in particular in exchange for remuneration.

As soon as vehicles 1 of the fleet of vehicles F no longer sense incidents E that indicate the hazard zone and therefore no corresponding information is being transmitted to the central computer unit 2, the hotspot is deleted from the digital map of the central computer unit 2. This hotspot is, then, removed, and is no longer transmitted as a warning message to the vehicle 1 when vehicle 1 is detected near it.

The vehicle user of vehicle 1 can adjust whether he wants the hotspot displayed as a warning message in the vehicle 1, so that it depends on the chosen setting in the vehicle 1 whether the hotspot is displayed or not.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for identifying potential hazard zones in road traffic by vehicles connected to a central computer unit, the method comprising:
- recording an incident indicative of a potential hazard zone and transmitting the recorded incident to the central computer unit with a geolocation of the incident, wherein the recorded incident is vegetation obscuring a pedestrian crossing;
- listing the transmitted incident as a hotspot in a digital map if there are a large number of similar incidents with a same geolocation as the incident;
- adding contextual information to the transmitted incident;
- analyzing the hotspot to recognize a potential hazard zone;
- comparing the hotspot with confirmed hotspots; and
- depicting the hotspot and confirmed hotspots on a platform, wherein a geolocation of a hotspot of confirmed traffic-critical incidents is transmitted to an authority to be checked or as a warning message to a vehicle that is near the geolocation of the hotspot of the confirmed traffic-critical incidents,
- wherein the geolocation of the hotspot is reported to a road authority.

2. The method of claim 1, wherein the contextual information is a time of day, a direction of travel of the vehicle, a length of a signal, a number of incidents over time, a level of curvature of a road, historical accidents, photographic and map data, pedestrian movements, cultural events at a certain time of day, or further data points from other data providers.

3. The method of claim 1, wherein a hotspot of a certain traffic-critical incident is transmitted to and displayed on a display unit of an infotainment system of the vehicle as a warning message.

4. The method of claim 1, wherein the hotspot and the confirmed hotspots depicted on the platform are validated by users of the platform.

5. The method of claim 1, wherein the hotspot is deleted from the digital map if the incident indicating the potential hazard zone is no longer detected by vehicles.

6. A central computer unit configured to identify potential hazard zones in road traffic by vehicles connected to the central computer unit, wherein a control unit of the vehicles is configured to detect an incident indicative of a potential hazard zone using signals recorded by an environmental sensor in the vehicle and to transmit the incident and a geolocation of the incident to the central computer unit over a data connection, the central computer unit being configured to:

receive the transmitted incident with the geolocation of the incident from the vehicle over the data connection, wherein the transmitted incident is vegetation obscuring a pedestrian crossing;

list the transmitted incident as a hotspot in a digital map if there are a large number of similar incidents with a same geolocation as the incident;

add contextual information to the transmitted incident;

analyze the hotspot to recognize a potential hazard zone;

compare the hotspot with confirmed hotspots; and depict the hotspot and confirmed hotspots on a platform, wherein a geolocation of a hotspot of confirmed traffic-critical incidents is transmitted to an authority to be checked or as a warning message to a vehicle that is near the geolocation of the hotspot of the confirmed traffic-critical incidents, wherein the geolocation of the hotspot is reported to a road authority.

* * * * *